Patented Sept. 16, 1930

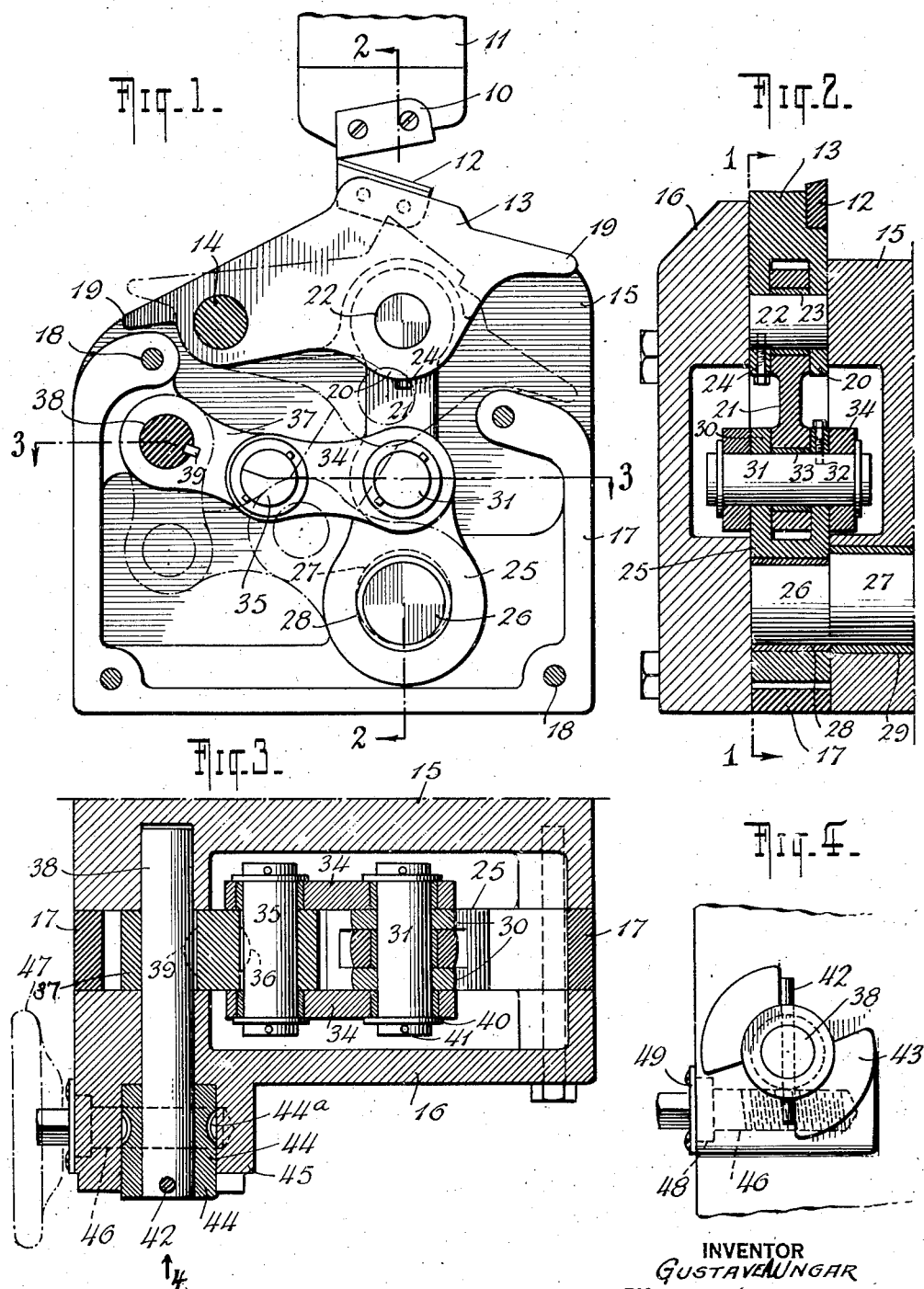

1,775,791

UNITED STATES PATENT OFFICE

GUSTAVE A. UNGAR, OF PELHAM MANOR, NEW YORK

CUTTING SHEARS AND DRIVING MECHANISM THEREFOR

Application filed May 20, 1927. Serial No. 192,812.

This invention relates to cutting shears for cutting sheet material and particularly to shears of the type wherein one of the members of a pair of cutting blades is rapidly reciprocated to and from the other blade with a stroke of small amplitude, and wherein the blades have their cutting edges inclined to each other to provide an open throat in which the material to be cut is fed, the inclination of said cutting edges being such that a small portion only of such edges is effective during each stroke of the movable blade.

The principal object of the present invention is to provide a new and improved construction for the mechanism which actuates the movable blade.

Another important object of the present invention is to associate with such mechanism, means for enabling the movable blade to be moved to and from an operative to an inoperative position; the relative positions of the blades, when the movable blade is in operative position, being such that the effective cutting portions of the edges may be said to pass or intersect each other at all times and, when the movable blade is moved to the inoperative position, a relatively large gap or open space is left between the effective portions of the cutting edges to provide an ample space into which the work sheet may be inserted.

A further object is to so construct the mechanism for actuating the movable blade, and the said means associated therewith, that the movable blade may be moved to and from its operative position while the movable blade is being driven.

The above and other objects will appear more fully from the following more detailed description and by reference to the accompanying drawings forming a part hereof, wherein Fig. 1 is a section taken substantially on the line 1—1 of Fig. 2 of a portion of a cutting shears embodying the principles of my invention; Fig. 2 is a section on the line 2—2 of Fig. 1; Fig. 3 is a section on the line 3—3 of Fig. 1, and Fig. 4 is a detail side elevation of the device for actuating the means for moving the blade to and from an operative position, said view showing the parts as seen from the direction of the arrow 4 in Fig. 3.

The invention is shown in the drawings as applied to a shears of the type wherein a cutting blade 10, mounted upon any suitable support, such as indicated at 11, preferably in a normally stationary position, has its cutting edge inclined to the plane of the work and also to the cutting edge of a co-operating cutting blade 12, the latter being mounted for movement to and from the blade 10 with a rapid reciprocating stroke of small amplitude. In the particular constructional example illustrated, the cutting blade 12 is preferably mounted upon a blade carrier 13, which is pivoted upon a fixed pivot bolt 14. The blade carrier 13 is slidably mounted, and held against lateral movement, within a guideway formed between the front face of a supporting bracket or frame 15 and a cover plate 16, secured in spaced relationship to said bracket 15 by means of a spacer 17, interposed between said bracket and cover, and the cover being held securely in position upon the frame by a plurality of bolts 18, which pass through the cover and spacer and are screwed into the bracket 15.

As clearly shown in Fig. 1 of the drawings, the spacer 17 is in the form of a U-shaped member, and the spacer 17, the bracket 15 and cover plate 16, define a housing in which a portion of the blade actuating mechanism is enclosed. This housing is closed at the top by the blade carrier 13 and, in order to prevent the falling into such housing of chips of metal or other foreign material, the blade carrier is provided at each side thereof and adjacent to its top, with a pair of ears 19, which project over the top side edges of the spacer 17 and serve to deflect any foreign material away from the opening left at the top of the U-shaped spacer 17.

Adjacent to its lower end and immediately below the blade 12, the blade carrier 13 is slotted to provide a pair of laterally spaced yoke jaws 20, between which the upper end of a connecting link 21 is adapted to be received. The connecting link 21 is pivotally connected to the blade carrier 13 by means of a connecting pin 22, which passes through suitable apertures provided in said jaws 20 and in the upper end of said connecting link 21. The upper end of the link 21 is rotatably mounted upon the pin 22, a bushing 23 preferably being interposed between said link and pin, while the pin 22 is held against movement relatively to the blade carrier by means of a lock bolt 24, which passes through one of the yoke jaws 20 and engages within a hole or recess of the connecting pin.

The lower end of the connecting link 21 is connected with an eccentric strap 25, the latter being also slidably mounted in the guideway formed between the bracket 15 and cover 16 and having a bore adjacent to its lower end, in which is engaged an eccentric throw 26 of a crank shaft 27. The crank shaft 27 is suitably journaled within the frame 15, and any suitable bearings, such as the bushings 28, 29 respectively, may be interposed between the eccentric throw and the eccentric strap and between the shaft 27 and the frame 15.

In order to connect the connecting link 21 with the eccentric strap 25, one of these members, and preferably the strap 25, is provided with a pair of yoke jaws 30, between which the adjacent end of the other member is received. As shown in the drawings, the lower end of the connecting link 21 is engaged between the yoke jaws 30, formed upon the eccentric strap 25. The connecting link 21 and eccentric strap 25 have their adjacent ends pivotally connected together, by means of a connecting pin 31, which passes through suitable apertures provided in the connecting link 21 and yoke jaws 30; the connecting link being rotatable upon the pin 31 and the pin being fixed against rotation within the yoke jaws by means of a bolt 32. A bushing 33 is preferably interposed between the connecting link 21 and the pin 31.

The connecting pin 31 projects outwardly beyond each of the yoke jaws 30 and has pivotally mounted upon each of said projecting ends, one end of a link 34, there being a pair of said links, one for each projecting end of the pin 31, as clearly shown in Figs. 3 and 4 of the drawing. The other ends of the links 34 are pivotally mounted upon the projecting ends of another pin 35, which passes through and is keyed, as by the key 36, within an aperture provided in one end of an actuating or adjusting lever 37. The adjusting lever 37 is mounted at its other end upon an adjusting shaft 38 and is keyed to said shaft by the key 39. In order to retain the connecting links upon their pins 31 and 35, each of the projecting ends of said pins has mounted thereon a washer 40, which washers engage the outer faces of the links 34 and are held in position upon their respective pins by means of the stop pins 41.

The adjusting shaft 38 is journaled within axially aligned bearings provided in the bracket 15 and the cover plate 16, and said shaft projects outwardly beyond the outer face of the cover 16, as shown in Fig. 3 of the drawings. The projecting outer end of the shaft 38 has secured therein a stop pin 42, the ends of which, as clearly shown in Fig. 4, project laterally from the shaft, and said ends are located within the spaces provided between a pair of arcuate segmental stop lugs 43, formed on the front face of the cover 16. The stop pin 42 is also employed for securing to the end of the shaft 38 a small worm wheel 44, which is rotatably mounted within a laterally projecting bearing boss 45, preferably formed integral with the cover 16. This worm wheel 44 has formed therein a worm thread 44$^a$, with which meshes the threads of a worm shaft 46, rotatably mounted within the boss 45. One end of the worm shaft 46 projects outwardly beyond the boss 45 and said projecting end is squared or otherwise suitably formed, in order to permit the engagement with said shaft of an actuating handle 47. In order to prevent movement of the worm shaft longitudinally of the boss 45, said shaft has formed thereon, adjacent to its outer projecting end, a shoulder or flange 48, which engages within a recess formed in the bearing boss 45 and is retained within said recess by means of a small plate 49, suitably secured to the boss 45.

The manner in which the parts operate is as follows: The crank shaft 27 is rapidly rotated by any suitable means, such as an electric motor (not shown), and the rotation of said shaft causes the eccentric throw 26 thereof to produce a movement of the lower end of the eccentric strap 25 in a circular path of small diameter. The horizontal component of this circular path does not produce any effective movement of the blade carrier 13 and the blade 12 mounted thereon, to cause a shearing cut to be effected, because of the fact that this horizontal movement merely produces a relative swinging or pivotal movement of the connecting link 21 upon the connecting pins 22 and 31. The vertical component of the movement of the lower end of the strap 25 results, however, in transmitting a reciprocation or oscillation of the blade carrier 13 upon its fixed pivot 14, as will be readily understood. The amplitude of this reciprocation obviously will be equal to twice the amount of eccentricity of the throw 26, and the effective portion of the cutting edge of the movable blade 12 will be caused to move in a path which, though slightly curved, and having for its centre the axis of the fixed pivot 14, is substantially a straight line reciprocation. The position of the axis of the fixed pivot 14 is preferably so located relatively to the effective portion of the cutting edge of the movable blade 12, that the path of such portion extends substantially at an angle of 45° to the cutting edge of the upper blade 10, so that when the blade is performing a cutting stroke, it will have a component of motion tending to draw the work into the open throat provided between the blades, as well as a component which causes the effective portions of the blades to pass or cross each other and to perform the shearing cut.

The normally operative position of the parts are as shown in full lines in Fig. 1 of the drawings. If, however, it is desired to start a cut at any inner portion of the work sheet, the lower blade may be moved away from the other blade to provide a substantial gap or clearance into which the work may be readily inserted. This movement of the movable blade 12 away from the upper blade 10 is accomplished by rotating the worm shaft 46, so as to cause the lever 37 to be moved in a clockwise direction, Fig. 1, towards the inoperative dotted line positions of the parts shown in said figure. Movement of the movable blade to and from the operative position obviously may be performed without interrupting its reciprocating movement, and the extent of the movement given towards the inoperative position may be determined by the thickness of the sheet to be cut. In order to limit this movement of the parts, the stop pin 42 and lugs 43 are provided. The stop 42 in one of its extreme positions of movement, as shown in Fig. 4, for example, serving as a means to indicate or locate the proper operative position of the blade 12 relatively to the blade 10, and in its other extreme position of movement, checking movement of the parts beyond the dotted line position thereof, shown in Fig. 1.

While I have shown the use of bushings interposed between the various members which have relative rotation, it will be understood that any suitable bearings such as ball or roller bearings may be used.

The present invention is illustrated in connection with, and is particularly adapted for use with, a shears of the type wherein the blades, as shown in Fig. 1 of the drawing, have their cutting edges inclined at an angle to each other to provide an open throat into which the work is fed, and said blades terminate at the inner end of said throat in a pair of opposed sharp points. When the movable blade is moved by means of the worm shaft 46, adjusting shaft 38 and lever 37, to or towards the inoperative position, shown in dotted lines in Fig. 1, and the work is inserted within the gap formed between the lowered or withdrawn movable blade 13, and then the manually operable device is again actuated to bring the blades to their normally operative position, it will be understood that as the movable blade is reciprocating rapidly, the sharp inner ends of the blades will penetrate readily through the material, and that a shearing cut may be started at any inner part of a sheet without it being necessary to punch or drill a hole to provide an edge upon which the blades may perform their shearing action.

It will be noted that the links 34 which connect the manually operable device with the driving mechanism form, in effect, a lost motion connection and that when the driving mechanism, consisting of the crank shaft 27, eccentric strap 25, connecting link 21 and associated parts, are operating, the movement of the pin 31 is not communicated to the lever 37, because the free pivotal connection of the links 34 with the pins 31 and 35 merely results in a free swinging or oscillation of such links upon said pins. It will therefore be obvious that any type of lost motion connection may be employed between the manually operable device and the driving mechanism, or between the manually operable device of the blade carrier which will permit the driving mechanism to perform its function, while at the same time allowing the movable blade to be moved to an inoperative position.

While I have shown the movable blade 12 as located below the stationary blade 10, and have shown only one of the blades movable while the other is shown as stationary, it will be understood that either the upper or the lower blade may be the movable blade, or, that if desired, both blades may be made movable.

It will also be understood that the specific details of the constructional example selected for the purpose of disclosing the principles of the present invention are merely illustrative, and that many changes, variations and modifications may be resorted to without departing from such principles.

I claim:

1. In a shears, a stationary cutting blade, a blade carrier mounted upon a fixed pivot, a movable blade secured to said blade carrier, driving mechanism for rapidly reciprocating said blade carrier and the blade carried thereby in a stroke of small amplitude, and manually operable means additional to said driving mechanism for swinging said carrier upon its pivot to move said movable blade to and from an operative position.

2. In a shears, a stationary cutting blade, a movable blade carrier and a blade carried thereby, a fixed pivot on which said blade carrier is mounted, driving mechanism including a pair of pivotally connected links for rapidly reciprocating said blade carrier to move its blade to and from the stationary blade with a stroke of small amplitude, a manually operable device and connections between said device and the pivotal connection of said links to cause said blade carrier to be moved, independently of its reciprocation, to and from a normally operative position and an inoperative position.

3. In a shears, a pair of blades, one of which is movable toward and from the other, a fixed pivot about which said movable blade oscillates, driving mechanism for swinging said blade about said pivot, a manually operable device, and connections between said device and driving mechanism for causing said movable blade to be moved to and from a normally operative position, said connections including means having a lost motion which permits the movement of said movable blade by said driving mechanism to be unaffected by the connection of said manual device therewith.

In testimony whereof I have hereunto set my hand.

GUSTAVE A. UNGAR.